United States Patent [19]

Higgins

[11] Patent Number: 5,176,067
[45] Date of Patent: Jan. 5, 1993

[54] INDOOR GRILL

[75] Inventor: David T. Higgins, Lee's Summit, Mo.

[73] Assignee: Rival Manufacturing Company, Kansas City, Mo.

[21] Appl. No.: 854,432

[22] Filed: Mar. 18, 1992

[51] Int. Cl.$^5$ .................. A47J 27/00; A47J 37/00; A47J 37/06
[52] U.S. Cl. .................. 99/340; 99/400; 99/401; 99/446; 99/447; 99/450; 99/482; 126/25 R; 126/275 E; 219/405; 219/461
[58] Field of Search .................. 99/339, 340, 400, 401, 99/446, 447, 450, 481, 482, 444, 445, 405, 345, 346; 219/401, 403, 405, 461; 126/25 R, 9 R, 9 B, 274, 369, 275 E, 275 R

[56] References Cited

U.S. PATENT DOCUMENTS

| | | | |
|---|---|---|---|
| 77,702 | 5/1868 | Zepff | 99/446 |
| 1,642,071 | 9/1927 | Hosking . | |
| 1,650,634 | 11/1927 | Lutzler . | |
| 2,984,171 | 5/1961 | Lee, Sr. | 99/482 |
| 3,078,783 | 2/1963 | Lee, Sr. | 99/447 |
| 3,212,426 | 10/1965 | Lewus | 126/369 |
| 3,490,357 | 1/1970 | Lescure | 99/400 |
| 3,527,154 | 9/1970 | Shaper et al. . | |
| 3,543,672 | 12/1970 | Payonk . | |
| 3,623,422 | 11/1971 | Marshall . | |
| 3,664,322 | 5/1972 | Clark | 99/450 |
| 3,678,844 | 7/1972 | Marshall . | |
| 3,722,399 | 3/1973 | Cole | 99/345 |
| 3,745,912 | 7/1973 | Field . | |
| 3,776,127 | 12/1973 | Muse . | |
| 3,789,748 | 2/1974 | Rappoport et al. . | |
| 3,805,688 | 4/1974 | Gvozdjak . | |
| 3,811,375 | 5/1974 | Fritzsche . | |
| 3,848,110 | 11/1974 | Giguere et al. . | |
| 4,430,559 | 2/1984 | Rabay | 126/25 R |
| 4,454,805 | 6/1984 | Matthews . | |
| 4,509,412 | 4/1985 | Whittenburg et al. | 219/401 |
| 4,694,816 | 9/1987 | Fabbro . | |
| 4,729,297 | 3/1988 | Iranzadi | 99/339 |
| 4,862,795 | 9/1989 | Hawkins . | |
| 4,909,137 | 3/1990 | Brugnoli . | |
| 4,982,656 | 1/1991 | Stone | 99/450 |

FOREIGN PATENT DOCUMENTS

| | | | |
|---|---|---|---|
| 2349020 | 4/1975 | Fed. Rep. of Germany | 99/482 |
| 2739170 | 3/1979 | Fed. Rep. of Germany | 99/401 |
| 627760 | 8/1949 | United Kingdom | 99/447 |

OTHER PUBLICATIONS

Brochure, *Brinkmann* for the Smoke 'N Grill outdoor electric cooker, Aug. 1989.
Brochure, *Rival* for the K. C. Smoker electric outdoor smoker, date unknown.

*Primary Examiner*—Timothy F. Simone
*Attorney, Agent, or Firm*—Willian Brinks Olds Hofer Gilson & Lione

[57] ABSTRACT

An apparatus for grilling food includes a base, a reflector positioned within the base, a heating element mounted upon the base and spaced above the reflector, and a food-supporting grill. The reflector includes a downwardly sloped bottom surface having a central region shaped to define a flavor well and a plurality of perforations disposed outside of the flavor well to direct drippings away from the flavor well.

16 Claims, 3 Drawing Sheets

INDOOR GRILL

BACKGROUND OF THE INVENTION

The present invention relates generally to the field of indoor grills, and more specifically to improvements in indoor grill design which allow flavoring agents to be introduced to food during grilling and which divert drippings away from the heating element during grill use.

Grills for indoor use are well known and commercially available. A major disadvantage of many indoor grills is that grease and other drippings extracted from food during the grilling process drip into the indoor grill and collect near the heating element. The heat from the heating element causes the drippings to evaporate, resulting in excessive smoke and unpleasant odors, which are undesirable in an indoor environment.

Devices that attempt to solve this problem have been disclosed in various patents. For example, U.S. Pat. No. 4,909,137 to Brugnoli discloses a grease pan having a sloped bottom surface for diverting grease to an outlet. A grease reservoir is connected to the outlet for containing the grease. U.S. Pat. No. 1,642,071 to Hosking discloses a conically-shaped reflector plate which diverts juice drippings via an outlet at the bottom of the reflector plate to a substantially enclosed receptacle. U.S. Pat. No. 3,745,912 to Field describes a collection means having a sloped bottom for diverting grease drippings. The grease drippings are drained from the collection means and collected in a jar via an opening in the bottom of the collection means.

Indoor grills typically are designed with electric or gas heating elements. Charcoal briquets, wood chips and other heating materials which provide flavoring agents when burned or heated are generally not utilized in indoor grills due to the retention of smoke in the indoor environment. Thus, foods cooked on indoor grills generally do not exhibit the "smoked" or "charcoaled" flavors which people enjoy and are produced by many outdoor grills.

SUMMARY OF THE INVENTION

According to a first aspect of the present invention, an apparatus for grilling food is provided comprising a base and a reflector positioned within the base. The reflector comprises a central region shaped to define a flavor well and a plurality of perforations disposed outside of the flavor well to divert drippings away from the flavor well. A heating element is mounted upon the base and is positioned above the central region of the reflector. A food-supporting grill is supported above the base.

According to a dependant aspect of the present invention, there is provided an apparatus for grilling food comprising a base and a drip pan positioned within the base. A reflector comprising a central region shaped to define a flavor well and a plurality of perforations disposed outside of the flavor well to direct drippings away from the flavor well is positioned within the base at a location above the drip pan. A heating element is mounted upon the base and is positioned above the central region of the reflector. A food-supporting grill is supported above the base.

The present invention has a number of advantages over known indoor grill designs. If desired, liquid flavoring agent(s) may be placed in the flavor well before grilling. During the cooking process, the flavoring agents ascend from the flavor well and flavor the food. Thus, the present invention allows persons to flavor their food without having to tolerate the undue amount of smoke typically generated by conventional flavoring materials (i.e. wood chips, charcoal, etc.).

Additionally, the perforations in the bottom surface of the reflector divert food drippings away from the flavor well and out of the reflector. After falling through the perforations, the drippings collect in either the base or the drip pan, depending on the embodiment of the present invention being used. In the base or drip pan, the drippings are sufficiently removed from the heating element to permit the drippings to cool. This prevents the drippings from burning and/or smoking—an unpleasant condition for indoor use of a grill. The perforations, by diverting most of the drippings away from the flavor well, maintain the flavoring agents in a relatively pure condition. An inordinate amount of drippings in the flavor well would most likely generate smoke and unpleasant odors.

It is an object of the present invention to provide a reflector plate for an indoor grill having a sloped bottom surface and perforations for diverting grease and other drippings away from the heating element of the indoor grill.

It is another object of the present invention to provide a flavor well in a reflector plate for an indoor grill such that the food being cooked may be flavored with a flavoring agent placed in the flavor well.

Further objects of the invention will be brought out in the following detailed description.

DETAILED DESCRIPTION OF THE PRESENTLY PREFERRED EMBODIMENTS

Figure 1:
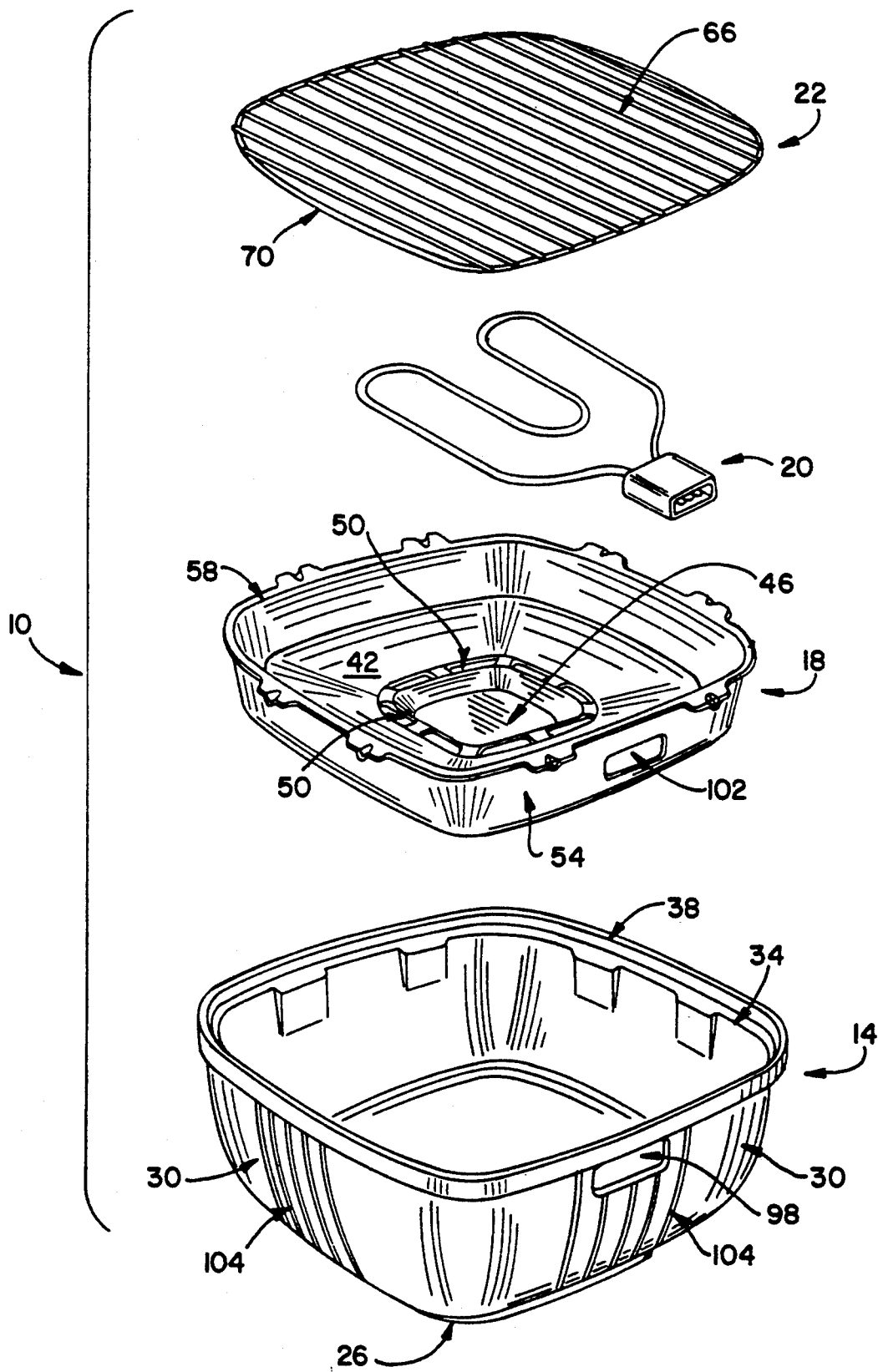
FIG. 1 is an exploded perspective view of an indoor grill which incorporates a presently preferred embodiment of this invention.

As shown in FIG. 1, an indoor grill 10 comprises a base 14, a reflector 18, a heating element 20 and a food-supporting grill 22. The base 14 of the indoor grill 10 comprises a bottom 26, four connected side walls 30 extending around the perimeter of the bottom 26, an outwardly extending lip 34 at the top of the side walls 30, and a raised edge 38 at the upper end of the lip 34. Alternately, if the base 14 of the indoor grill 10 is substantially circular in horizontal section, the four connected side walls 30 of the base 14 may be replaced by a single continuous side wall (not shown). If this alternate base configuration is used, the shape of the elements resting within or upon the base 14 are preferably configured to match that of the base 14.

The reflector 18 comprises a downwardly sloped bottom surface 42 having a central region shaped to define a flavor well 46 and a plurality of perforations 50 disposed outside of the flavor well 46, a peripheral wall 54 disposed around the bottom surface 42, and a raised perimeter ledge 58 extending outwardly from the wall 54. The reflector 18 rests within the base 14 and is positioned above the bottom 26 thereof.

The heating element 20 is removably mounted upon the base 14 and is positioned above the bottom surface 42 of the reflector 18. The heating element 20 may be of an electric, gas or other known design, although an electric design is preferred.

The food-supporting grill 22 may be supported above the base 14 at a position above or below the heating element 20. Although the food-supporting grill 22 may be configured in various ways, the design preferred in the present invention comprises a plurality of transverse rods 66 supported upon a closure rod 70.

During the cooking process, grease and fat are drawn out of the food. These grease and fat drippings pass through the food-supporting grill 22 and fall upon the reflector 18. The downwardly sloped bottom surface 42 of the reflector 18 causes the drippings to flow toward the center of the reflector 18. Perforations 50 disposed throughout the bottom surface 42 of the reflector 18 divert the drippings away from the flavor well 46 and cause the drippings to pass through the reflector 18 and to collect in the base 14 of the indoor grill 10. In the base 14, the drippings are sufficiently removed from the heating element 20 so that they do not produce excessive smoke and/or unpleasant odors. While it is contemplated that the perforations 50 may be randomly disposed throughout the bottom surface 42 of the reflector 18, in the preferred embodiment of the present invention the perforations 50 are disposed in a line along the perimeter of the flavor well 46.

Figure 3:
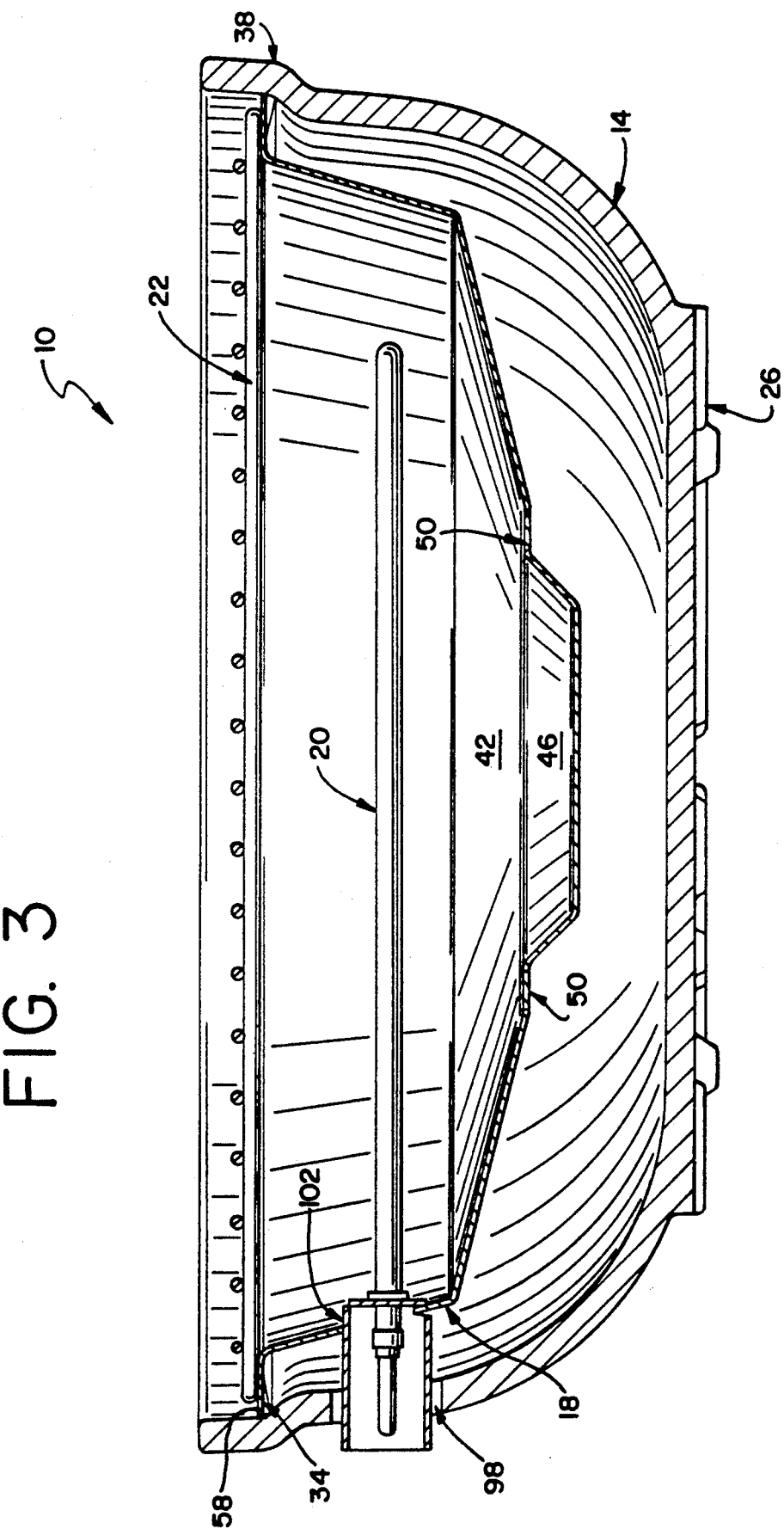
FIG. 3 is a cross-sectional view of the assembled indoor grill of FIG. 1.

As shown in FIG. 3, the raised perimeter ledge 58 of the reflector 18 rests upon the lip 34 of the base 14. The heating element 20 is positioned within the indoor grill 10, as described later in the detailed description, such that the heating element 20 rests above the bottom surface 42 of the reflector 18. The food-supporting grill 22 is supported above the heating element 20 by the raised perimeter ledge 58 of the reflector 18.

Figure 2:
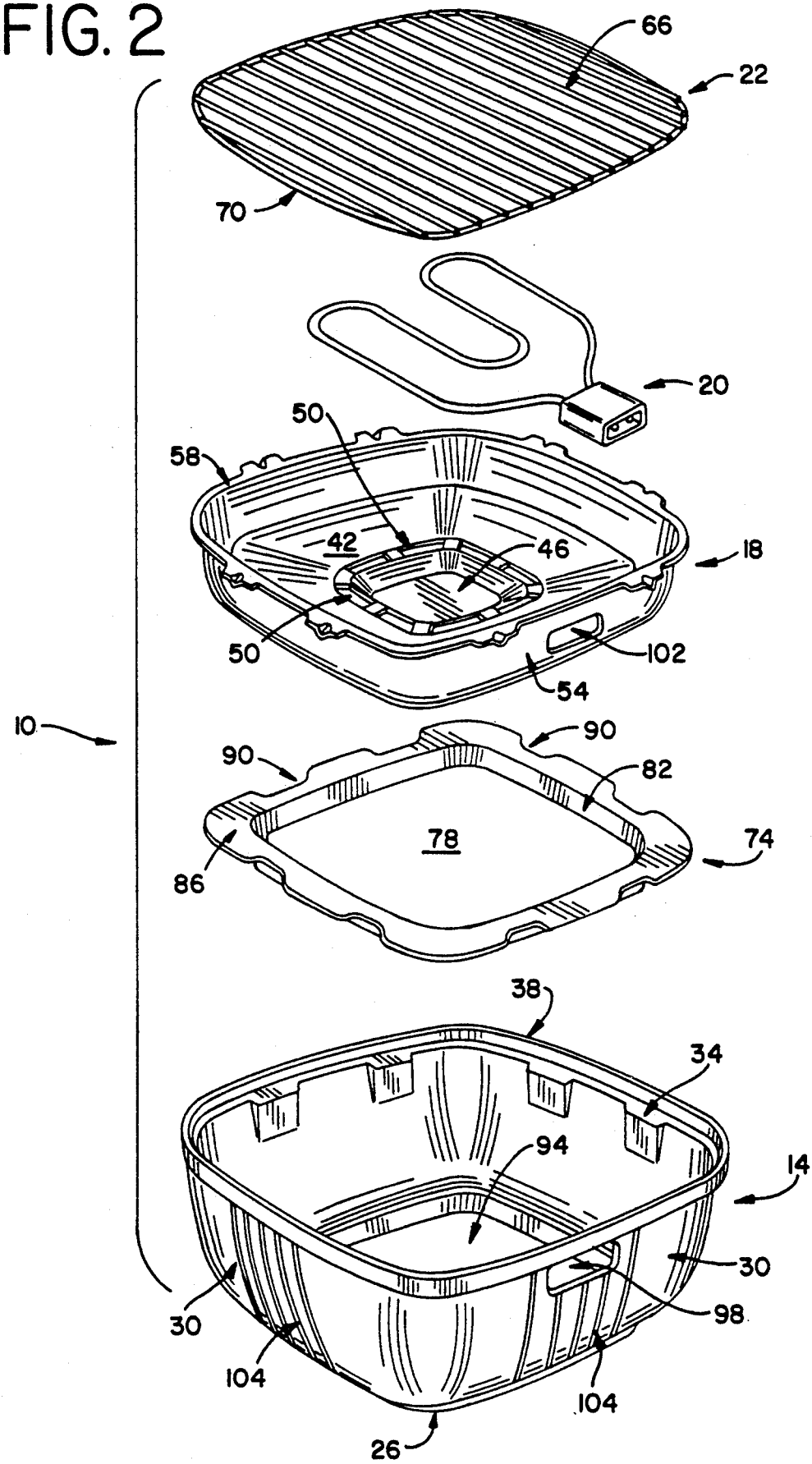
FIG. 2 is an exploded perspective view of an alternate embodiment of the indoor grill of this invention.

Alternately, as shown in FIG. 2, a drip pan 74 may be placed between the reflector 18 and the bottom 26 of the base 14 to permit easier clean-up and disposal of grease and fat drippings. Instead of collecting in the base 14 of the indoor grill 10, the grease and fat drippings collect in the drip pan 74. After each use of the indoor grill 10, the drip pan 74 can be easily removed from the indoor grill 10 and cleaned. The drip pan 74 may comprise a flat plate (not shown) of necessary size and shape for it to rest within the base 14 of the indoor grill 10. However, in the preferred embodiment of the present invention, the drip pan 74 comprises a bottom wall 78, a wall 82 disposed along the perimeter of the bottom wall 78, and a raised perimeter rim 86 extending outwardly from the wall 82 and having a plurality of apertures 90 therein. The apertures 90 allow cooling air to circulate around the drip pan 74, thereby aiding in the cooling of the grease and fat drippings. In addition, to further aid in the cooling of the grease and fat drippings, thereby further reducing the amount of smoke and unpleasant odors generated, the base 14 of the indoor grill 10 may be configured such that the bottom 26 of the base 14 has an opening 94 therein. The opening 94 cooperates with the apertures 90 in the drip pan 74 to permit greater circulation of cooling air around the drip pan 74.

As discussed above, charcoal briquets and other materials which create flavoring agents when burned are not typically used in indoor grills, and for this reason a flavor well 46 is included in the reflector 18 of the indoor grill 10. One or more flavoring agents may be placed in the flavor well 46 before grilling. During grilling, the food being cooked will be flavored with the flavoring agent(s) placed in the flavor well 46. Thus, persons using the indoor grill 10 may prepare "smoked" or otherwise flavored food without having to endure the attendant smoke indoors. While the flavor well 46 may be configured in a variety of shapes and designs, in the preferred embodiment of the present invention the flavor well 46 is substantially rectangular in shape.

Furthermore, the unique design of the reflector 18 allows it to both retain and divert liquids in the indoor grill 10. Specifically, the flavor well 46 retains flavoring agent(s) in the reflector 18, while the perforations 50 divert liquids (i.e. grease and fat drippings) away from the flavor well 46 and out of the reflector 18.

In the preferred embodiment of the present invention, and as shown in FIGS. 1 and 2, a side wall 30 of the base 14 has a slot 98 therein and the peripheral wall 54 of the reflector 18 has an opening 102 therein. When the reflector 18 is placed in the base 14 of the indoor grill 10, it is positioned such that the opening 102 in the reflector 18 and the slot 98 in the base 14 are aligned. In this manner, the heating element 20 may be mounted upon the base 14 and positioned above the bottom surface 42 of the reflector 18 via the slot 98 and the opening 102. A wire (not shown) may be extended between two sections of the peripheral wall 54 to further support the heating element 20.

For decorative purposes, as shown in FIGS. 1 and 2, the outside of the four connected side walls 30 of the base 14 may have a plurality of parallel, longitudinal grooves 104 incised thereon. The grooves 104 are arranged into four groups of equal numbers and are symmetrically spaced around the outside of the base 14.

The following materials have been found suitable for use in the indoor grill 10: the food-supporting grill 22 may be formed of chrome-plated steel; the reflector 18 may be formed of aluminum; the base 14 may be formed of glazed stoneware; and the heating element may be a 1100 Watt tubular sheathed-type electric heating element 20.

It should be appreciated that the indoor grill 10 of this invention may be shaped and configured in various ways and as appropriate for the application. The embodiments described above are to be considered in all respects only as illustrative and not restrictive. The scope of the invention is indicated by the following claims rather than by the foregoing description. All changes which come within the meaning and range of equivalency of the claims are to be embraced within their scope.

I claim:

1. An apparatus for grilling food, which comprises:
   a) a base;
   b) a reflector positioned within said base, said reflector comprising a downwardly sloped bottom surface having a central region shaped to define a flavor well and a plurality of perforations disposed outside of the flavor well to divert drippings away from the flavor well;
   c) a heating element mounted upon said base and spaced above the bottom surface of said reflector; and
   d) a food-supporting grill supported above said base.

2. The apparatus for grilling food of claim 1, further comprising a drip pan positioned below said reflector within said base.

3. The apparatus for grilling food of claim 2 wherein said drip pan comprises a perimeter rim having a plurality of apertures therein.

4. The apparatus for grilling food of claim 2 wherein said base comprises a bottom, the bottom defining an opening therein positioned beneath the drip pan.

5. The apparatus for grilling food of claim 1 wherein the plurality of perforations in the bottom surface of said reflector are disposed around the outside of the flavor well.

6. The apparatus for grilling food of claim 5 wherein the plurality of perforations are disposed in a line along the perimeter of the flavor well.

7. The apparatus for grilling food of claim 1 wherein:
   a) said base comprises a side wall, the side wall defining a slot therein; and
   b) said reflector further comprises a perimeter wall, the perimeter wall defining an opening therein, said reflector positioned in said base such that the slot in the side wall of said base and the opening in the perimeter wall of said reflector are aligned, said heating element situated in the apparatus for grilling food via the opening in the perimeter wall of said reflector and the slot in the side wall of said base.

8. The apparatus for grilling food of claim 7 wherein said base further comprises:
   a) an outwardly extending lip at the top of the side wall; and
   b) a raised edge at the end of the outwardly extending lip.

9. The apparatus for grilling food of claim 7 wherein the side wall of said base comprises four connected walls.

10. The apparatus for grilling food of claim 7 wherein said reflector further comprises a raised perimeter ledge extending outwardly from the perimeter wall, said food-supporting grill resting upon the raised perimeter ledge.

11. The apparatus for grilling food of claim 1 wherein the downwardly sloped bottom surface of said reflector causes drippings falling thereon to be directed toward the flavor well, the perforations in the bottom surface of said reflector diverting the drippings to said base before the drippings enter the flavor well.

12. The apparatus for grilling food of claim 1 wherein the flavor well is substantially rectangular in shape.

13. The apparatus for grilling food of claim 1 wherein said food-supporting grill is positioned above said heating element.

14. An indoor grill, which comprises:
   a) a base comprising
      i) a bottom,
      ii) four connected side walls, one side wall having a slot therein,
      iii) an outwardly extending lip at the top of the four side walls, and
      iv) a raised edge at the end of the lip;
   b) a drip pan comprising
      i) a bottom wall,
      ii) a wall disposed along the perimeter of the bottom wall, and
      iii) a raised perimeter rim extending outwardly from the wall and having a plurality of apertures therein, said drip pan positioned within said base at a location above the bottom thereof;
   c) a reflector comprising
      i) a downwardly sloped bottom surface having a central region shaped to define a flavor well and a plurality of perforations disposed in a line along the perimeter of the flavor well to divert drippings away from the flavor well,
      ii) a peripheral wall disposed around the perimeter of the bottom surface, one wall having an opening therein, and
      iii) a raised perimeter ledge extending outwardly from the peripheral wall,
   said reflector positioned within said base at a location above said drip pan, said reflector positioned in said base such that the slot in the side wall of said base and the opening in the wall of said reflector are aligned;
   d) a heating element mounted upon said base and spaced above the bottom surface of said reflector, said heating element situated in the indoor grill via the opening in said reflector and the slot in said base; and
   e) a food-supporting grill positioned above said heating element.

15. The indoor grill of claim 14 wherein the bottom of said base defines an opening therein positioned beneath said drip pan.

16. The indoor grill of claim 14 wherein the flavor well is substantially rectangular in shape.

* * * * *